United States Patent [19]

Swift et al.

[11] 4,001,967

[45] * Jan. 11, 1977

[54] SELF-WATERING PLANTER AND PROCESS OF MAKING

[76] Inventors: June H. Swift; John A. Swift, both of 2740 Mayhew Drive, Dallas, Tex. 75228

[ * ] Notice: The portion of the term of this patent subsequent to Sept. 9, 1992, has been disclaimed.

[22] Filed: Mar. 7, 1975

[21] Appl. No.: 556,409

Related U.S. Application Data

[63] Continuation-in-part of Ser. No. 362,535, May 21, 1973, Pat. No. 3,903,644.

[52] U.S. Cl. .................................. 47/80; 47/58
[51] Int. Cl.² ........................................ A01G 27/00
[58] Field of Search ................. 47/34, 38, 58, 38.1, 47/38.10; 220/13; 264/154

[56] References Cited

UNITED STATES PATENTS

| 267,296 | 11/1882 | Wilder | 47/38 |
|---|---|---|---|
| 1,815,676 | 7/1931 | Medveczky | 47/38 |
| 2,288,678 | 7/1942 | Blumentritt | 47/38 |
| 2,499,885 | 3/1950 | Sommer | 47/38 |
| 2,519,166 | 8/1950 | White | 47/38 |
| 3,067,543 | 12/1962 | Bracey | 47/38.1 |
| 3,557,490 | 1/1971 | Delaney | 47/38.1 |
| 3,733,746 | 5/1973 | Allen, Jr. | 47/38 |
| 3,753,315 | 8/1973 | Adam | 47/38 |
| 3,758,987 | 9/1973 | Crane, Jr. | 47/38.1 |
| 3,903,644 | 9/1925 | Swift et al. | 47/38 |

FOREIGN PATENTS OR APPLICATIONS

| 496,138 | 10/1950 | Belgium | 47/38.10 |
|---|---|---|---|
| 1,200,203 | 12/1959 | France | 47/38.1 |
| 1,208,813 | 9/1960 | France | 47/38 |
| 867,180 | 2/1953 | Germany | 47/38.10 |
| 1,045,712 | 12/1958 | Germany | 47/38 |
| 131,297 | 4/1929 | Switzerland | 47/38 |
| 1,096,014 | 12/1967 | United Kingdom | 47/38.1 |

OTHER PUBLICATIONS

Davis, Bernard D., et al. Microbiology 1973 Chapter 64 "Sterilization and Disinfection" Harper and Row Pub., Inc., N.Y. p. 1458.

The Nature and Properties of Soils by Harry O. Buckman and Nyle C. Brady 7th Ed. 1969 Macmillan Co. Chapter 7.

Primary Examiner—Edgar S. Burr
Assistant Examiner—James R. Feyrer

[57] ABSTRACT

An automatic self-regulating water control arrangement in a unique structural planter configuration that is suited to an economical and yet fool-proof method of manufacturing. A vacuum control in combination with capillary action is necessary to properly dispense the moisture required, and the final sealing of the water reservoir provides the secure vacuum means needed and permits conclusive testing of the vacuum before putting into use.

11 Claims, 17 Drawing Figures

SELF-WATERING PLANTER AND PROCESS OF MAKING

This application is a Continuation-In-Part of copending application of the instant inventors, entitled "Self-Watering Planter and Method of Making Same," Ser. No. 362,535, filed May 21, 1973, now U.S. Pat. No. 3,903,644, and the specification of the prior application is in part incorporated herein.

BACKGROUND OF THE INVENTION:

1. Field of the Invention:

This invention relates generally to flower and plant containing pots and planters and more particularly to that class of such containers that are self-watering.

2. Statement of the Prior Art:

The prior art dicsloses self-watering planters in which the water level is controlled through the use of a vacuum, but for the most part, these planters are difficult to construct and subject to certain deficiencies in operation.

Examples of such prior art devices may be seen in the following patents:

U.S. Pat. No. 3,043,053 to Peters disclosed a plastic molded self-watering flower pot that had an upper section defining a peripherial water chamber and a relatively large central opening in it's bottom wall and wherein a water regulating plastic pad surrounded the opening. A bottom plate having a passage from the opening to the water chamber was then bonded to the lower inside periphery of the outer side walls.

U.S. Pat. No. 3,192,665 to Cloud disclosed a two piece self-regulatory flower pot in which a soil receptacle is suspended in a transparent outer shell forming a water chamber therebetween. The soil receptacle is made of porous material so that water from the chamber may pass through the porous material into the soil in response to moisture tension. This disclosure of a porous material, if used in Applicants' structure, would permit air to enter the water reservoir from the soil area and higher, and would destroy the vacuum control necessary for Applicants' operation.

U.S. Pat. No. 1,214,356 to Natvig disclosed a receptacle having inner and outer walls spaced apart with webs and defining a water space therebetween and having feed apertures in the inner bottom wall to permit moisture passage into the soil area.

U.S. Pat. No. 2,084,005 to Richards disclosed an auto irrigation system having vertical outer walls and inclined inner walls defining a water chamber to permit water passage through the porous ceramic inner wall under pressure.

U.S. Pat. No. 2,344,794 to Vallinos was for a combined flowerpot and jardinierre in which the outer walls are glazed to prevent moisture escape. The flower pot was spaced from the bottom of the jardinierre and permitted water passage therebetween. The flowerpot nested into the jardinierre and their outer walls engaged in a flush manner and sealed off the water area. This combination did not however rely on a vacuum feed technique for its operation.

U.S. Pat. No. 3,775,904 issued Dec. 4, 1973, to Peters was for a self-watering flowerpot that generally used a sponge to transfer water from the reservoir and utilized relatively sharp upstanding mating edges for bonding the outer and inner receptacles together. Applicants' device deliberately avoids these characteristics in his invention.

U.S. Pat. No. 3,783,555 issued Jan. 8, 1974 to Peters for a self-watering flowerpot comprising a large water transfer opening surrounded by a relatively high wall. This device also has a wide upper platform which would defeat one of the Applicants' purposes as hereafter described. While one of the purposes of this Peters patent was to eliminate the need for the porous plug, as shown in Peters U.S. Pat. No. 3,775,904, by a tortuous water flow passageway and soil buffer, the Applicants' have accomplished this result by merely metering the water flowing through the water inlets.

While other patents have also been granted in the art of self-watering planters, and while they, like the above cited disclosures, serve useful functions in this crowded art, none of them accomplish the Applicants' purpose in the specific manner or with the precise structure of the Applicants' invention.

SUMMARY OF THE INVENTION:

A principal object of this invention is to provide a simple, easy to assemble self-watering planter and a fool-proof economical method of manufacturing same, so that once assembled and tested, the user may be assured of years of productive usage.

Another object is to provide a method of manufacturing a two-piece plastic planter assembly wherein a soil receptacle is surrounded by a water container and the two pieces are assembled after molding into a water and air-tight structure that is fully tested for leakage before completion, to insure that proper operation will occur when filled with soil and water.

A still further object is to provide a light-weight self-watering planter that contains a non-destructible soil indicating line and a water fill opening that will always be above the soil line so that soil will not slip through the water fill opening and clog the lower water capillary openings. The water fill opening area is also guarded by an upstanding ridge so that surplus water may not spill into the plant area, or that soil may not migrate into the fill opening.

And yet another object of this invention is to provide a structurally secure yet extremely thin wall planter assembly that is of a convenient size for lifting with one hand. This same structural configuration also permits the entire assembly to be suspended by spaced apart hooks at the top rim of the planter requiring no bottom support.

BRIEF DESCRIPTION OF THE DRAWINGS:

FIG. 8 is an enlarged detailed fragmentary elevational view in cross-section of the upper right corner of FIG. 4 showing a means for suspending the planter from a ceiling or the like.

DESCRIPTION OF ILLUSTRATED EMBODIMENTS:

This invention is particularly adapted to be constructed of a plastic material that may be injection molded into very thin semi-rigid wall members. Specific examples, by way of illustration but not of limitation, of the type of plastics that may be used are as follows:

A B S
DELDRIn
NYLON
POLYSTYRENE (hi impact)
PVC
POLYPROPOLENE

Other requirements of the material selected for use in this invention are that it be light in weight, non-porous, easily and securely bonded to itself, and easily pierced, including burning, punching and drilling. The wall thickness of the material in the finished product is an important factor in the strength and cost and should desirably be held within the range of 0.015–0.150 inch, and the preferable size being 0.0625 inch.

Figure 1:
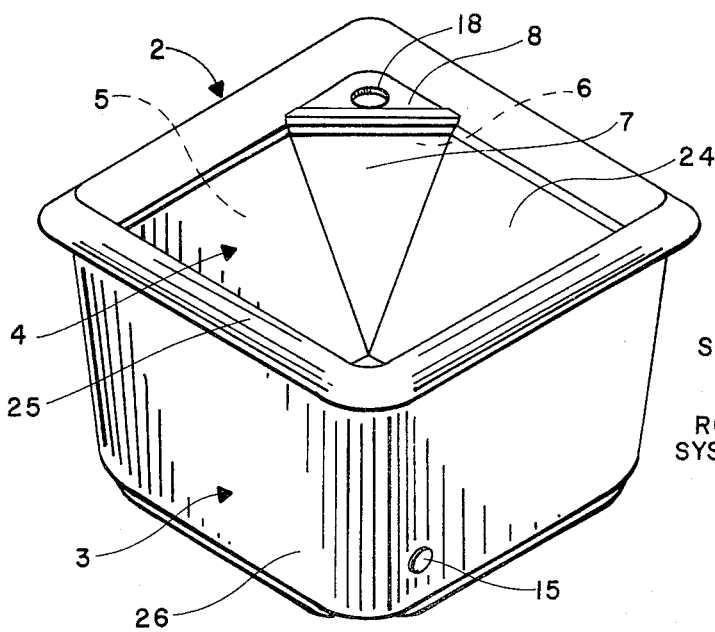
FIG. 1 is a perspective view of the self-watering planter of this invention in an unfilled condition.

FIG. 1 shows the self-watering planter of this invention in a pictorial view before it has been filled with earth or water. Its construction may be best explained by simultaneous reference to both FIGS. 1 and 4. The planter, identified generally at 2, is comprised of an outer shell 3 which functions as a support for the inner shell 4 and as a water reservoir 5 when the two shells are joined. The inner shell 4 is offset at one corner to form an enlarged water cavity 6 having a corner plate 7 and enclosed by a triangular top plate 8. It has been found desirable to include a ridge 8a on plate 8 to prevent water, when filling, from running over into the soil area and guard against soil migrating to the fill hole.

Figure 11:
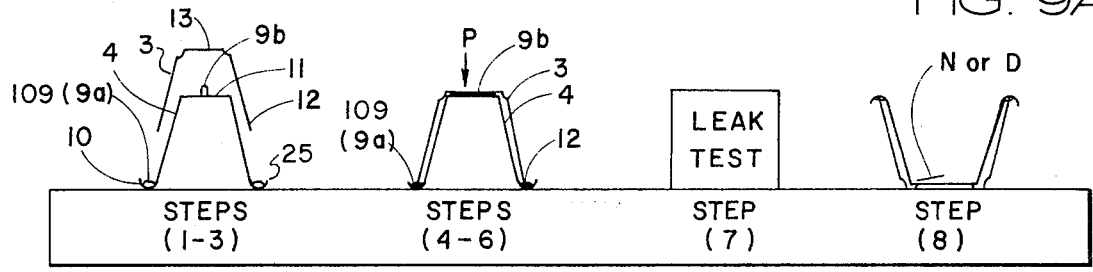
FIG. 11 is a diagrammatic outline view showing certain method steps employed in this invention.
Figure 4:
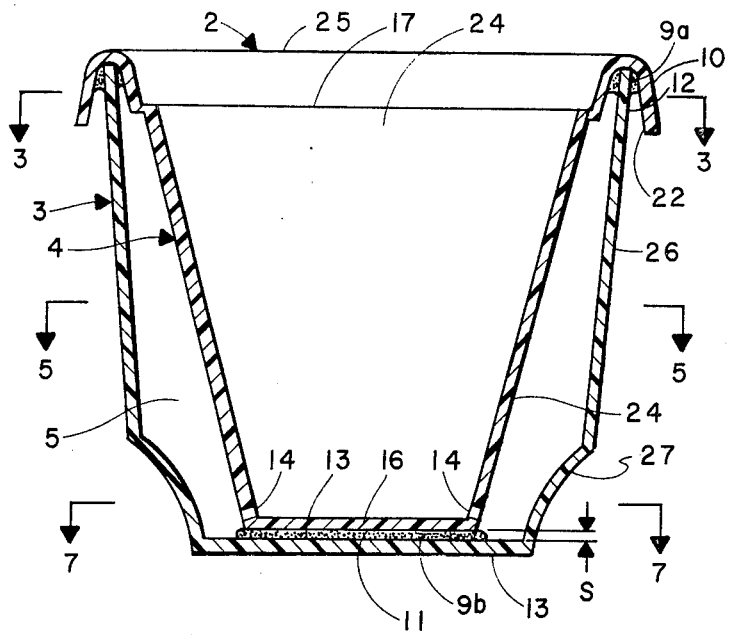
FIG. 4 is an elevational view in cross-section taken along the lines 4—4 of FIG. 2.

The two shells 3 and 4 are injection molded in separate operations and after water level hole 15a is formed and water level indicating plug 15 glued in place, shells 3 and 4 are then assembled in the manner shown in FIGS. 4 and 11 through the following steps to form a planter structure, using a suitable fusing means such as lacquer thinner (for example Cook's No. 89), or a suitable glue such as polystryrene adhesive or, alternately, a special mixture of the material of the planter dissolved in lacquer thinner to a fluid paste consistency (i.e. polystyrene chunks dissolved in clear lacquer thinner, for example: Cook's No. 89):

1. Invert inner shell 4 on table or workbench.
2. Deposit a stream of lacquer thinner 109 in channel 10 formed in lip 25 when shell 4 is inverted.
3. Deposit layer or a blob of glue 9b on outer bottom surface 11 of inner shell 4, or alternatively, omit glue here if surfaces 11 and 13 substantially or physically join.
4. Superimpose outer shell 3 over inner shell 4 while the latter is still inverted and apply manual pressure (P) to force outer shell edge 12 in direct contact with inner cavity of channel 10 of inner shell 4 and allow parts to securely fuse together. It has been found that when using a fine stream of about one-sixteenth of an inch deep of lacquer thinner only, a "welded" bond is obtained (as lacquer thinner dissolves the surfaces of polystyrene, et al) in which the parts 25 and 12 fuse together and form a structural joint that is superior to that formed when using a glue, per se. The lacquer thinner "weld" dries so much faster than a glued joint, that production time is more than cut in half by this technique. In this step, the open upper edge 12 of shell 3 "bottoms out" in the channel 10, but the dimensions of the parts are such that a space (S) remains and may be filled with glue 9b in one embodiment. In another embodiment, the surfaces may join or substantially eliminate space "S" without glue therebetween.
5. While edge 12 and the cavity of channel 10 are being joined, a thin stream of lacquer thinner 109 maintains a uniform height completely around the periphery of channel 10, and fuses the adjacent members in a manner superior to that obtained with glue 9a while employing less material and sealing in a shorter time, i.e. approx. 12 hours versus approx. 24 hours for glue.
6. Simultaneously, with the bonding of edge 12 and channel 10, the outer bottom surface 11 of inner shell 4, which is slightly spaced from the corresponding surface of inner bottom 13 of outer shell 3, is being bonded to surface 13 through the layer of glue 9b that was previously deposited thereon. Alternatively these surfaces contact or substantially contact without glue.
7. When the glue has sufficiently hardened (approximately 24 hours) the now assembled planter unit is completely submerged in water to test all joints and the material itself for air leaks using an air pump having a pressure nozzle that will form an air-tight fit with water fill opening 18.
8. If no leaks are present, the air pump connection is removed and the planter 2 is returned to the bench in an upright position and holes 14 are selectively pierced through the thin plastic walls 24 using a small diameter heated needle or a small diameter drill. The holes 14 are located intermediate the corners at the area where the inner side walls 24 join the bottom 16. These holes 14 will function as air or water passageways when the planter 2 is in use. The diameter of the holes 14 and the number of such holes drilled bear a specific relation to each other, i.e. if the number of holes is increased, the diameter of the holes must be reduced to permit metering of the water without flooding. One satisfactory combination for this purpose is the use of four holes of approximately 0.032 inch in diameter.

In the copending application the holes were located in the corners where the material in the wall was thicker and were specified in one instance as in the range of 0.010–0.020 inch in diameter. The copending application also described the use of a hot No. 9 needle to form the water/air inlet holes 14. It has been found preferable to drill holes 14 which eliminates all of the material formerly in the hole area. The hot needle would cause a build-up of material on either side of the hole that would remain after the needle was removed. This in effect increased the thickness of material at the hole and could interfere with the capillary operation through the hole. After testing the planter for some time, it has been found that in using water from certain geographical locations with holes of this size, a bacterial growth developes that soon clogs the hole and prevents operation of the planter. We have now found however, that holes of approximately 0.020 inch in diameter or larger, up to approximately 0.035 inch in diameter, especially when coupled with additional precautionary steps for the smaller holes, will eliminate this problem. These precautionary steps include soaking the plastic planter in a bacteria resistant solution (such as commonly known antiseptics, including those sold under the brand names of Clorox and Purex) so that the plastic will be conditioned and will not permit bacterial growth. Another precautionary step includes the use of distilled water only in the planters. Still another precautionary step that is incorporated into one embodiment of this invention is the use of a copper bacterial inhibitor, as will be described hereinafter. Other precautionary steps were evaluated and found to be less effective than the above, or included other drawbacks (i.e., sandblasting and using polyethylene). While the exact scientific explanation of how this bacterial growth occurs is not commonly known, it is believed that minute bacteria in water from certain locations feeds on a material in the plastic and grows to large size unless eliminated.

Another discovery in the testing and use of this planter is that with holes in the corners there is a possibility that bird gravel may not fall or lay up against the corner well and permit an air pocket between the gravel and the hole and the planter may fail to start its necessary capillary action. The use of four holes drilled intermediate the corners has now proved to overcome this problem.

The planter 2 is now ready for use in its intended function which may be best accomplished by the following steps (See FIG. 9):

1. Deposit a layer of bird-gravel size or smaller rock, in the bottom of inner shell 4 to a height above the openings 14 which were formed just above the inner bottom 16 of inner shell 4 in side walls 24.
2. Fill the balance of the space in shell 4 with loose soil up to soil line 17 but not above, and pack while filling to moderate density.
3. Insert plants before, during or after the filling operation (2) as is most convenient in view of the initial size of the plant.
4. Fill the water reservoir 5 and enlarged cavity 6 with clean water and diluted soluble plant food (one-eighth of a teaspoon of plant food powder per gallon of water, or greater depending on plant food strength) until the liquid mixture (referred to as "water" for convenience) is visible at the water fill opening 18 on triangular cover plate 8 of inner shell 4.
5. Insert water fill plug 19 and place planter on level surface, preferably under a fluorescent lamp; or in a naturally lighted or darkened area as desired, or
6. Attach hooks 20 of a suspended chain 21 at appropriate locations (3 or 4) around the free lip 22 surrounding channel 10, if suspension is desired.

Figure 9:
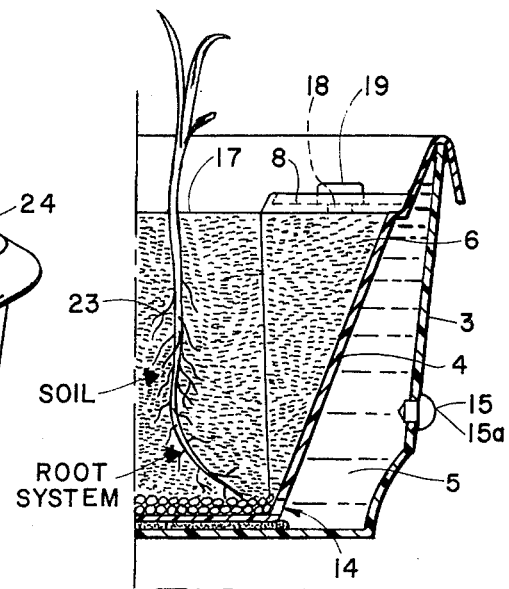
FIG. 9 is an enlarged cross-sectional fragmentary elevational view taken along the lines 9—9 of FIG. 2 and showing the planter in its functional use.

When the planter is in use the root system indicated in FIG. 9 with most plants will not extend far enough down to reach the floor 16, although some roots may travel down to and possibly engage floor 16. Continued growth would then cause the roots to travel laterally along floor 16 and possibly enter one of the air/water inlet holes 14. Such an entrance may block the opening and prevent passage of either air or water therethrough. In planters containing only two openings, this blocking of one hole would render the planter inoperative, whereas with three or more holes the operation cycle will continue, since one hole can admit air into the reservoir and the second hole can release water through the capillary action of the adjacent rocks or soil. The chances of two holes being clogged (in a particular time frame) by roots are more remote than for one hole.

Three holes 14 of the size range indicated are the minimum, and four holes are satisfactory to meter the water into the gravel and/or soil area when filling reservoir 5. More than four holes, or holes of a larger size could permit the water in the reservoir to flow in too fast when filling and thus saturate too much of the soil which would damage the plant. If two holes do become clogged (which is remote) the owner can simply remove the soil and punch out the hole with a needle. Whereas in planters that utilize sponge inserts or certain porous materials, it has been found that plant roots destroy the effectiveness of these elements and they are not readily replaceable, or the condition correctable, by the owner.

Figure 2:
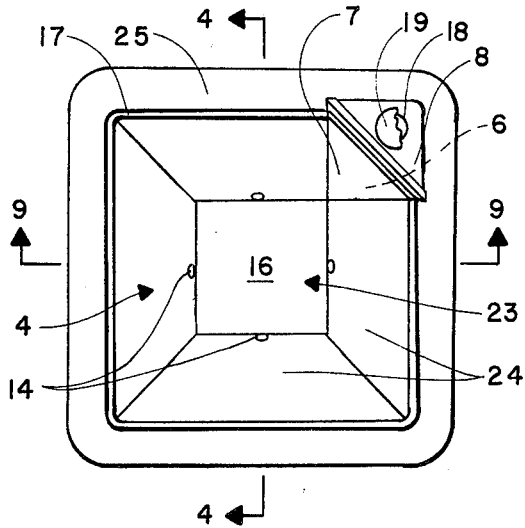
FIG. 2 is a top plan view of the device shown in FIG. 1 with its filler plug shown in fragmentary view.

FIG. 2 shows a top plan view of the planter 2 from a position of looking into the soil cavity, identified generally at 23. It will be observed that all of the inner walls 24 taper inwardly toward bottom plate 16, and that at the intersection of two of the walls 24 there is inserted a triangular corner plate 7 which, together with top plate 8, cover the enlarged corner water cavity 6. The four air/water inlet holes 14 just above bottom plate 16 are also visible in this drawing figure. Just inside the periphery of ridge 25 of the planter 2 is located as indentation or offset 17 in the tapered inner walls 24 so that the user may properly locate the level to which the soil may come for optimum operation. This soil line marker is permanent and cannot be erased with time. If soil were packed in the planter above this line it could find its way into and through opening 18 and thus provide a danger of clogging the openings 14 from inside the reservoir 5. Water fill opening 18 is sealed by plug 19 in both a water-tight and air-tight relationship, since the self-watering feature of this planter operates on a vacuum principle. It will be noted that triangular cover plate 8 engages the inner shell 4 just above the soil line offset 17, so that the water fill opening 18 is higher than the soil line 17 by the thickness of plate 8. This construction feature insures that loose soil will not seep into the corner reservoir water cavity 6 by way of hole 18.

Figure 3:
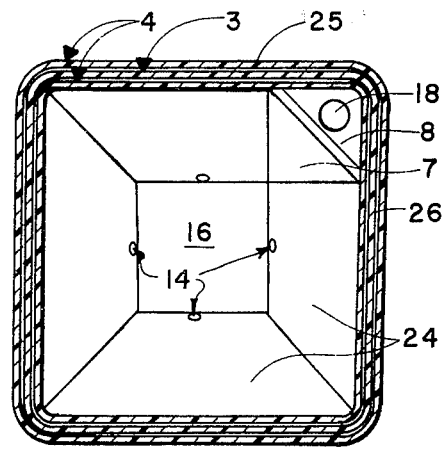
FIG. 3 is a plan cross-sectional view taken along the lines 3—3 of FIG. 4.

FIG. 3 is a cut-away view of the planter particularly as shown in FIGS. 2 and 4. This figure shows the intimate relationship between the structural parts of the outer and inner shells 3 and 4 that cooperate and re-enforce each other to provide a structurally stable planter even though all of the parts are thinner than would be feasible for use as the inner receptacle or the outer container if the parts were used separately. However, by making the outer container shell 3 slightly thicker it may be used as a stand-alone container that is suitable for nesting while shipping or storing. As a practical matter, it may be desirable to make a stand-alone thickness container in the first instance, so that only one mold is necessary. Production runs could then be made of say 1000 inner shells 4 and 1500 outer shells 3, so that 500 outer shells would be available for separate usage. However, the walls of the inner shell may be made the same, thicker or thinner, than the walls of the outer shell if desirable for a particular use.

Figure 6:
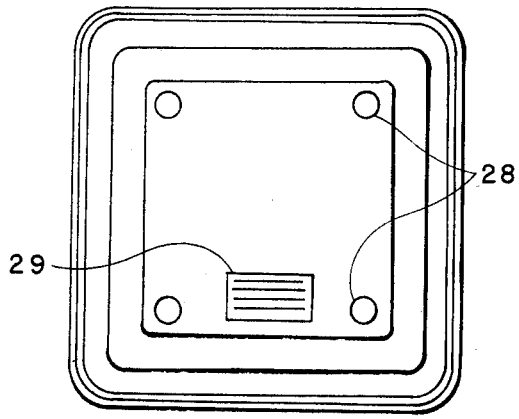
FIG. 6 is a bottom plan view of the device of FIG. 1.

FIG. 4 shows in detail how shells 3 and 4 combine to provide the strength and stability described above. The outer shell 3 surrounds the inner shell 4 and is firmly bonded thereto at most at only two locations: free end 12 of outer shell side walls 26 is firmly attached to the inner shell 4 in the cavity of channel 10; and the inner bottom surface 13 of outer shell 3 is firmly attached to the outer bottom surface 11 of inner shell 4. Alternatively, the surfaces 11 and 13 may engage or substantially engage without glue, if desired. The soil level line offset 17 also lends strength to the thin inner shell sidewalls 24, as does the concave ridge 27 that connects outer shell sidewalls 26 with outer shell bottom 13. The configuration of both the outer shell 3 and inner shell 4 are such that these parts are easily molded in a high pressure plastic injection mold, which will simultaneously form the four foot pads 28 and install nameplate 29 as shown in FIG. 6. Optionally, the information on the nameplate may be included in the mold, so that a separate plate is not required. Also optionally, the water fill plug 19 may be made of the same plastic as the planter body and if tapered slightly inwardly toward the bottom, will effectively seal the opening 18.

Figure 7:
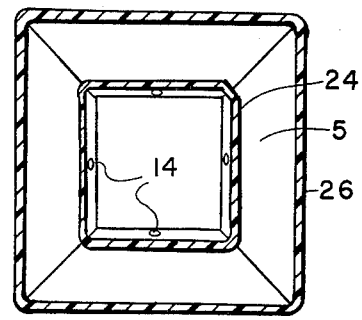
FIG. 7 is a plan cross-sectional view taken along the lines 7—7 of FIG. 4.
Figure 8A:
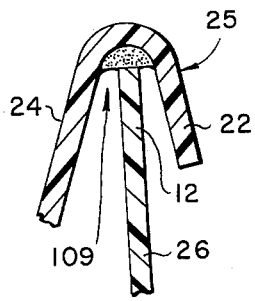
FIG. 8A is a fragmentary cross-sectional view as in FIG. 8 showing an improved structural assembly of the shells.
Figure 5:
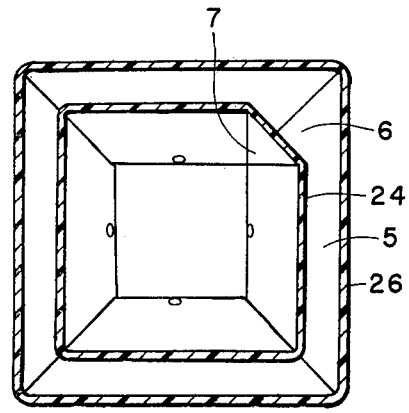
FIG. 5 is a plan cross-sectional view taken along the lines 5—5 of FIG. 4.

FIGS. 5 and 7 are plan cross-sections of FIG. 4 taken near the midpoint and bottom respectively to show the vast amount of reservoir that is provided in this planter relative to its total dimensions. The main reservoir 5 occupies the space between outer side walls 26 and the inner side walls 24, but as a practical matter, reservoir 5 overlaps and hence includes the water cavity 6 which is obtained by the inclusion of corner plate 7 in lieu of a straight line corner. This added water capacity of cavity 6 adds additional reservoir capacity and hence extends the time between water filling by a related amount.

A feature of this invention that adds to its merit is the economy and high productivity that is gained by the combination of its structure and the method employed to assemble the structural parts. For example, it is well known in product manufacture that the greater the precision required and the greater the labor, the higher the cost. But by using the method of making this planter 2 as shown in FIG. 11, it will be seen that the labor required is minimal and that no great precision is required. This latter is true because lacquer thinner, which drys rapidly, and securely seals and bonds, is used where parts are joined. The lacquer thinner will flow freely to fill the available void and then seal and "weld" by fusing adjacent parts and thereby provide water and air-tight seals(s) while providing the structural strength needed. The only dimensional requirement is that the free end 12 of the outer shell 3 seat in channel 10 before the bottom plates 16 and 13 of inner shell 4 and outer shell 3 engage. The space S in FIG. 4 may be substantially eliminated at this point, but in any event, glue is not normally required here except on very thin shell materials. Alternatively, if glue 9b is used it may substantially fill the space S, or simply form a concentrated contact area between the parts for structural reinforcement.

Figure 10:
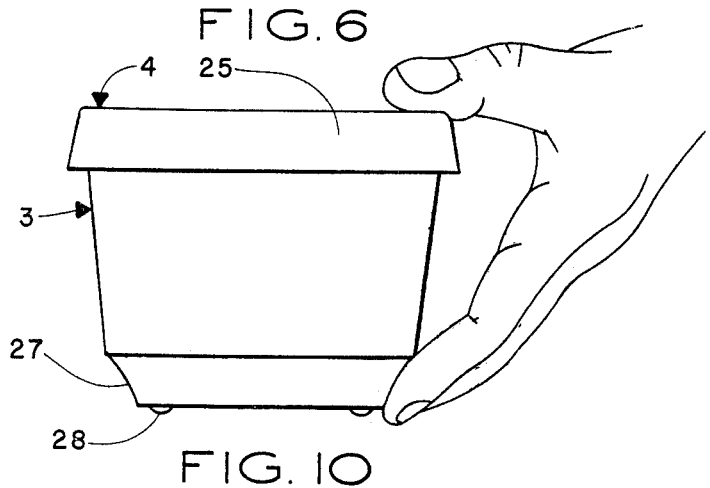
FIG. 10 is an outline view of the complete planter being manually transported by means of its unique structural configuration.
Figure 8:
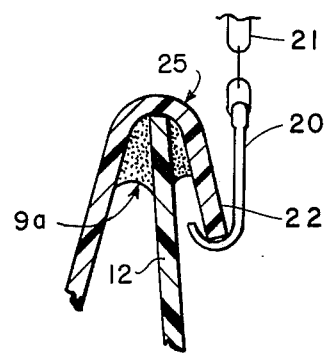

After the planter has been completed by the steps described above relative to FIGS. 4 and 11, it may be lifted and carried about as shown in FIG. 10, by placing one's fingers in the lower concave ridge 27 and placing the thumb over the top ridge 25. And, after the planter has been filled with soil, plants and water as described with reference to FIG. 9, it may still be transported as shown in FIG. 10. At this point it may also be suspended in mid-air for display purposes by attaching a small hook about the lower end 22 of ridge 25 at three or more spaced points around the periphery of the ridge 25. The projecting lip 22 also provides an easy lifting and transporting means for one hand or two hand manipulation.

Figure 9A:
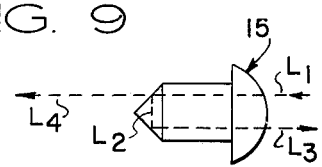
FIG. 9A is an enlarged detailed view partly in schematic illustrating the operation of the water level indicator plug.

The water level indicating plug 15 may be made of the same material as the planter if transparent. Due to the conical shape of the inner end of the plug, the reflection of light to the outside will be different when the water level is above the plug than when it is below the plug. This will provide a visual indication to an observer when the water (and plant food) in the reservoir needs replenishing. This plug 15 may also be of translucent plastic and may be installed in planters made in a variety of materials. FIG. 9A shows schematically how the water level indicating plug 15 functions. Ambient light L1 enters into transparent or translucent plug 15 and if no water is present within the reservoir 5 it will be reflected from one inclined surface down to the other inclined surface as L2 wherefrom it will then be reflected back out through the plug to the observer's eye as light L3. This indicates no water is in contact with the inclined surface and the reservoir is low. If the inclined surface receiving light is in contact with the water, the light L1 will be transmitted into the water as L4 and not reflected. The observer will be able to readily distinguish between these two conditions by the light intensity of the plug.

As simple as the construction of this planter would appear to the lay observer, and as loose as the dimensions have been made in those areas that contribute to economical assembly, there are certain areas of criticality (described above) in this planter and its manufacture, that, because of the demands of the user and the economics of the market place, if not observed and followed, would work to the detriment of the entrapeneur/manufacturer. These areas are the wall thickness dimensions, the peripheral square dimensions of both shells for registration purposes, and even the gravel size when filling for use must be controlled. But the most critical dimension is the combination of the available air/water inlet opening area and the number of such openings. In order to provide a practical guide to the size and number of openings that will be operable, it has been determined that the hole sizes when using 3 or 4 holes that provide a consistently satisfactory planter in various territorial locations, need to be from about 0.020 inch to 0.035 inch in diameter. To simplify the use of these measurements, it has been determined that the arbitrary numbers that result from multiplying the number of thousanths of an inch diameter times the number of holes define workable limits. For example, the number for the lower end of the range would be: 3 (number of holes) times 20 (diameter in thousanths) equals 60; similarly the upper end of the range is determined from: 4 times 35 equals 140. When using numbers near the lower end of this range, it is desirable and sometimes necessary to use the precautionary steps described herein.

Figure 12:
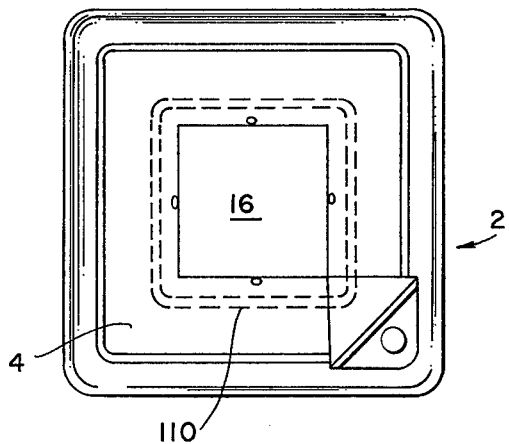
FIG. 12 is a top plan view of the planter of FIG. 13 showing the relative location of the copper bacteria inhibitor ring.
Figure 14:
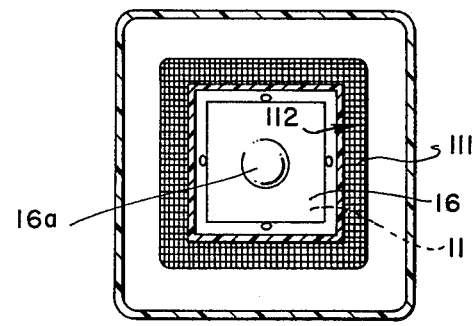
FIG. 14 is a top plan cross-section taken along the lines 14—14 of FIG. 15, illustrating another embodiment of a planter employing a copper bacteria inhibitor.
Figure 13:
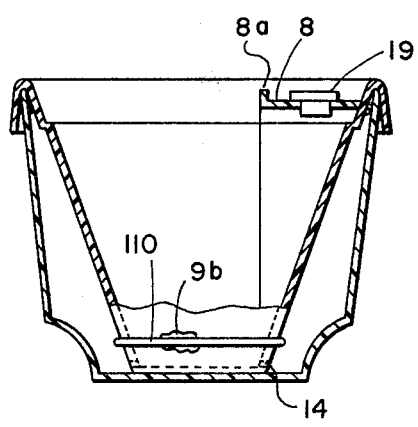
FIG. 13 is a side elevational view of the planter of FIG. 12, partly in cross-section, illustrating one embodiment of a planter employing a copper bacteria inhibitor.

There is one form of a precautionary step that can be taken to substantially permanently eliminate problems resulting from bacterial growth. This may be described as a precautionary structure, and consists of permanently installing copper metal inside the water reservoir. It is known that copper inhibits the growth of bacteria in a solution; however, copper is potentially dangerous to plant life if placed close to the roots. By surrounding the lower end of the inner shell 4 with a copper wire 110 as shown in FIGS. 12 and 13, a satisfactory bacteria inhibitor that is not closely adjacent the plant roots is obtained. By gluing the copper wire to the inner shell, a permanent structure results. Similarly, a copper screen 111 having an opening 112 may be placed, and/or glued (by glue 9b) as at 113 to the inner bottom area 11 of the outer shell 3.

Figure 15:
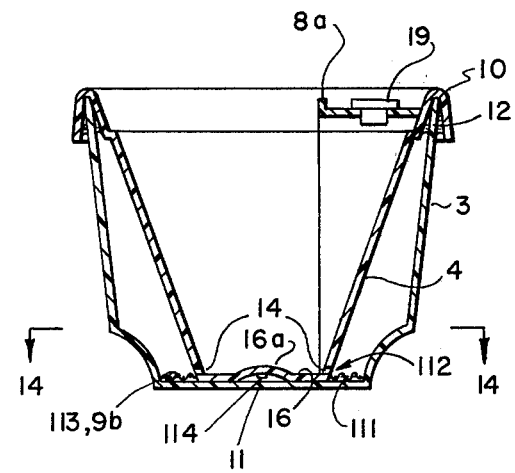
FIG. 15 is a side elevational cross-section of the device of FIG. 14.

FIG. 15 also shows a construction technique that assists in lowering the production cost of these planters by eliminating a costly labor step formerly required on certain production runs. In the injection molding step of producing the inner shell 4, a small sprew or sprig 114 was formed which could prematurely engage bottom plate 11 and prevent upper end 12 from seating in channel 10. To eliminate this problem, the sprew 114 had to be manually ground off the bottom side of inner shell bottom plate 16. To avoid this occurrence, a portion of the inner shell bottom was made concave as shown at 16a to raise sprew 114 so that it no longer touched the outer shell bottom 11.

Since the preferred construction here uses injection molded plastic, the outer and inner shells, being made in separate molds, may be made of different colored plastics for appearance sake. And, the outer shell may be made of transparent or translucent plastic so that the water level may be detected without the need of a separate water level indicator plug.

In the planter described herein, the peripherial sealing glue is exposed and accessible for easy repair after test, but it is not visible in ordinary use, and therefore, not unattractive. The glue also is in a location where it cannot come into contact with the plant which may be sensitive to certain glues.

The planter 2 is of such configuration and operating characteristics as to qualify as acceptable by both the African Violet Society of America, Inc. and Saintpaulia International. These regulations, for example, prohibit the use of a top edge that is wide and considered a leaf support in planters entered for competition. The instant planter combines the desirability of a top ridge that provides the structural connection of the shells, provides a hidden from sight and unexposed from plant contact glue area in a ridge that is smooth and narrow to meet the above requirements.

From the foregoing description and examples, it will be seen that there has been produced a method and a device that substantially fulfills the objects of this invention as set forth herein. The invention is not limited to what is herein shown and described, but is applicable to that which falls within the scope of the appended claims.

We claim:
1. An all plastic, vacuum operated, automatically controlled, self-watering planter structure, comprising:
   a. an inner shell containing soil medium, gravel or the like and having a square bottom plate and upwardly tapering side walls terminating in an inverted channel of square plan configuration,
   b. an outer shell having a square bottom plate larger than said inner shell bottom plate and upwardly tapering side walls terminating in an ipen end of compatible dimension to said square plan configuration, said side walls being smaller in cross-section than the channel they engage,
   c. a bonding means consisting of lacquer thinner joining said outer and inner shells in the vertex of said channel in such a manner as to define a vacuum-tight water reservoir therebetween,
   d. a plurality of opening means communicating between said water reservoir and the soil medium compartment of said inner shell and located intermediate the corners of the side walls adjacent to the bottom plate of the inner shell and being so restricted in size, quantity and location as to meter water along a gradient created by the capillary action of the soil medium in response to evapotranspiration, through one or more of said opening means from said reservoir into said inner shell when air enters to partially satisfy a partial vacuum in the reservoir through at least one of the other similar restricted opening means into said vacuum-tight water reservoir,
   e. the product of said opening means in thousandths of an inch in diameter times the number of said opening means being within the arbitrary numbers range of 60 to 140 inclusive.

2. A self-watering planter as in claim 1, wherein the number of opening means is four and each having a diameter within the range of 0.020–0.035 inch.

3. A self-watering planter as in claim 1, wherein said bonding means includes the combination of a thin stream of pure lacquer thinner in said channel and material from the periphery of said open end of said outer shell and said channel.

4. A self-watering planter structure, comprising:
   a. an inner shell having a bottom plate for receiving soil medium, gravel or the like, and side walls tapering upwardly therefrom, and an inverted channel at the upper end of side walls,
   b. an outer shell having a bottom plate larger than said inner shell bottom plate and side walls tapering upwardly to a lesser degree than said inner side walls and an open upper end thereon,
   c. said inner shell being nested within said outer shell and forming a water reservoir therebetween,
   d. said outer shell side walls open end residing in said inner shell side wall inverted channel at its vertex and forming therewith a bonding means recess to insure a vacuum-tight seal between said outer and inner shells when said recess contains bonding means,
   e. said inner shell bottom plate registering with and being over said outer shell bottom plate, and is contiguous thereto, f. bonding means of pure lacquer thinner between said outer and inner shells at most in the area of said channel and bottom plates, g. a plurality of openings communicating between the soil medium compartment of said inner shell and the liquid reservoir of said outer shell and located in the side walls adjacent the bottom plate of the inner shell and being so restricted in size, quantity and location as to meter water into said soil medium along a gradient created by the capillary action of the soil medium in response to evapotranspiration thru certain of said openings while air is passing into said reservoir to partially satisfy a partial vacuum in the reservoir thru at least one of the other similar openings, h. a copper material bacteria inhibiting ring attached to the surface of said inner shell in the vicinity of said bottom plate and residing in said water reservoir.

5. A self-watering planter structure, comprising:

a. an inner shell having a bottom plate for receiving soil medium, gravel or the like, and side walls tapering upwardly therefrom, and an inverted channel at the upper end of the side walls, b. an outer shell having a bottom plate larger than said inner shell bottom plate and side walls tapering upwardly therefrom to a lesser degree than said inner side walls and an open upper end thereon, c. said inner shell being nested within said outer shell, and forming a water reservoir therebetween, d. said outer shell side walls open end residing in the inner shell side wall inverted channel at its vertex and forming therewith a bonding means recess to insure a vacuum-tight seal between said outer and inner shells when said recess contains bonding means, e. said inner shell bottom plate registering with and being over said outer shell bottom plate and in proximity is contiguous therewith, f. bonding means between said outer and inner shells at most in the area of said channel and bottom plates, g. a plurality of openings communicating between the soil medium, gravel or the like compartment of said inner shell and the liquid reservoir of said outer shell and located in the side walls adjacent the bottom plate of the inner shell and being so restricted in size, quantity and location as to meter water into said gravel, along a gradient created by the capillary action of the soil medium in response to evapotranspiration thru certain of said openings while air is passing into said reservoir to partially satisfy a partial vacuum in the reservoir thru at least one of the other similar openings, h. a copper material bacteria inhibiting structure attached to the surface of said inner shell and residing in said water reservoir.

6. A vacuum controlled self-watering planter structure comprising:

a. an inner shell having a bottom plate for receiving soil medium, gravel or the like, and side walls tapering upwardly therefrom, and an inverted and enlarged channel at the extreme upper end of the side walls, b. an outer shell having a bottom plate larger than said inner shell bottom plate and side walls tapering upwardly to a lesser degree than said inner shell side walls and an open upper end thereon, c. said inner shell being nested within said outer shell, and forming a water reservoir therebetween, d. said outer shell side walls open end residing in said inner shell side wall inverted and enlarged channel at its vertex and forming therewith an enlarged bonding means recess larger than the cross-section of said outer shell side walls to insure a vacuum-tight seal between said outer and inner shells when said recess contains bonding means, e. said inner shell bottom plate registering with and spaced over and contiguous with said outer shell bottom plate, f. said bonding means comprising chemically formed, fused welds between said outer and inner shells at most in the areas of said channel and between said bottom plates, g. a plurality of openings communicating the soil medium compartment of said inner shell and the liquid reservoir compartment of said outer shell and located in the side walls, said opening being adjacent the bottom plate of the inner shell and being so restricted in size, quantity and location as to meter water into soil medium along a gradient created by capillary action of the soil medium in response to evapotranspiration thru certain of said openings while air is passing into said reservoir to partially satisfy a partial vacuum in the reservoir thru at least one of the other similar openings, h. said openings comprise the diameter size range between 0.020 and 0.035 inches inclusive, and the quantity range of three to four.

7. A self-watering planter structure, comprising:

a. an inner shell having a bottom plate for receiving gravel, soil medium, or the like, and side walls tapering upwardly therefrom, and an inverted channel at the upper end of the side walls, b. an outer shell having a bottom plate larger than said inner shell bottom plate and side walls tapering upwardly to a lesser degree than said inner shell side walls and an open upper end thereon, c. said inner shell being nested within said outer shell and forming a water reservoir therebetween, d. said outer shell side walls open end residing in said inner shell side wall inverted channel at its vertex and forming therewith a bonding means recess to insure a vacuum-tight seal between said outer and inner shells when said recess contains bonding means, e. said inner shell bottom plate registering with and being over said outer shell bottom plate, and is contiguous thereto, f. bonding means of pure lacquer thinner between said outer and inner shell at most in the area of said channel and bottom plates, g. a plurality of openings communicating between said soil medium compartment of said inner shell and the liquid reservoir compartment of said outer shell and located in the side walls adjacent the bottom plate of the inner shell and being so restricted in size, quantity and location as to meter water into said gravel along a gradient created by the capillary action of the soil medium in response to evapotranspiration thru certain of said openings while air is passing into said reservoir to partially satisfy a partial vacuum in the reservoir thru at least one of the other similar openings, h. a reservoir fill plug in said reservoir and normally forming a vacuum-tight seal therewith, i. said openings further being of such a dimensional size and quantity as to prevent flooding from the water reservoir to the soil medium during the time when said fill plug is removed for filling purposes.

8. A self-watering planter as in claim 7, wherein said openings are between 0.020 and 0.035 inches in diameter and said planter inhibits bacterial growth.

9. A self-watering planter as in claim 7, wherein at least one of said shells includes means to inhibit bacterial growth.

10. A self-watering planter as in claim 9, wherein said precautionary structure is a copper element near the bottom of the water reservoir.

11. A self-watering planter structure as in claim 7, wherein said shells are polystyrene plastic and wherein said planter is bacteria resistant.

* * * * *